United States Patent [19]

Orso et al.

[11] 3,888,963
[45] June 10, 1975

[54] IN-LINE HOMOGENIZING OF EXTRUDABLE CERAMIC BATCH MATERIALS

[75] Inventors: Francis L. Orso; Giacomo J. Piazza, both of Corning, N.Y.

[73] Assignee: Corning Glass Works, Corning, N.Y.

[22] Filed: Sept. 18, 1973

[21] Appl. No.: 398,379

[52] U.S. Cl. ............ 264/176 R; 264/349; 425/197; 425/198
[51] Int. Cl. ......................... B28b 3/20; B28b 17/02
[58] Field of Search ............ 264/102, 209, DIG. 78, 264/176 R; 425/198

[56] References Cited
UNITED STATES PATENTS

| | | |
|---|---|---|
| 1,478,842 | 12/1923 | Staley .................................. 264/102 |
| 3,032,822 | 5/1962 | Maddock ........................ 264/176 R |
| 3,390,216 | 6/1968 | Umeya et al ...................... 264/102 |
| 3,406,435 | 10/1968 | Dietzsch ............................ 425/198 |
| 3,790,654 | 2/1974 | Bagley ................................ 264/56 |

*Primary Examiner*—Donald E. Czaja
*Assistant Examiner*—H. H. Fletcher
*Attorney, Agent, or Firm*—Burton R. Turner; Clarence R. Patty, Jr.

[57] ABSTRACT

Plastically moldable ceramic batch material, which may be flowably extruded under pressure into a self-supporting article of desired shape and configuration, is passed through a flow homogenizer positioned within an extrusion cylinder upstream of an article-forming extrusion die positioned on the discharge end of the extrusion cylinder, to thoroughly homogenize such batch material during the extrusion operation and prior to being fed through the article-forming die.

4 Claims, 3 Drawing Figures

IN-LINE HOMOGENIZING OF EXTRUDABLE CERAMIC BATCH MATERIALS

BACKGROUND OF THE INVENTION

The present invention pertains to the art of manufacturing extrudable articles, and particularly thin-walled honeycomb structures from extrudable ceramic batches which have the property of being able to flow or plastically deform under pressure during extrusion, while being able to maintain their as-extruded from under ambient conditions after being relieved of the high extrusion force. More particularly, the present invention relates to an improved method of conditioning and/or refining extrudable ceramic batch material by purifying and homogenizing the same while it is subjected to extrusion pressures during the operation of extruding a finished product, but prior to such material being extruded through a discharge die for forming the finished article.

In the extrusion forming of articles from ceramic material, it has been common practice to pre-extrude the ceramic batch material through a pre-extrusion die prior to the final extrusion process, in order to further homogenize and de-air the batch. Such a pre-extrusion die is provided with a plurality of bores or passages extending therethrough for forming strands or "noodles" of batch material which is subsequently re-extruded into a final article. In fact, the pre-extrusion die is also known in the trade as a noodle die or "spaghetti" die due to the noodle or spaghetti-like shape of the batch as it is discharged therefrom.

When utilizing a piston and cylinder type of extrusion chamber, as opposed to a screw feed extrusion chamber utilized with organic plastic materials, the extruding process by necessity becomes one of a "batch" operation. That is, the piston or plunger is extracted, the cylinder filled with previously pre-extruded spaghetti batch material, and the plunger then moved forwardly within the cylinder, after adequate evacuation thereof to prevent voids, so as to extrude the thus charged batch material outwardly through the article-forming die on the discharge end of the extrusion cylinder. When the plunger has completed its travel, it is again withdrawn from the cylinder, the cylinder again recharged with a new supply of previously pre-extruded spaghetti batch material, and after suitable evacuation of the cylinder the plunger is again moved forwardly to recommence to extrusion of the newly charged material through the article-forming die. This batch process is continuously repeated until article requirements are fullfilled.

It has been found that by compacting the pre-extruded noodle batch material into billets of cylindrical shape having a cross section substantially equal to the cross section of the extrusion cylinder, a greater quantity of batch can be loaded into the cylinder and thereby increase the output from the extrusion die per plunger travel. The compacted batch material or billets are also extruded as a batch operation similar to that previously described relative to the spaghetti batch material. However, when utilizing compacted batch in billet form it was found that an interface was formed between adjacent billets which was carried into the extrusion die resulting in problems relating to the formation of voids and torn skins in the finished article, particularly when extruding honeycomb articles having thin walls forming longitudinal passages. Similar types of interface problems were also encountered between succeeding charges of the spaghetti batch material.

The present invention overcomes the problems encountered in the prior art relative to the formation of interfaces between adjacent batch material which tend to result in voids and skin peel-off in the finished product, by homogenizing the batch material within the extrusion cylinder during the extrusion operation but prior to being forced through the article-forming extrusion die. To accomplish this end, after the billets of ceramic batch material have been loaded into the extrusion cylinder, the cylinder is evacuated and the plunger moved forwardly to force the billets through a homogenizer positioned a given distance upstream of the extrusion die. The homogenizer not only screens out unwanted large particles of particulate matter in the batch material but also breaks-up and homogenizes the interfaces between adjacent billets by again forming the billets into strands, and then compacting the strands or spaghetti into a continuous slug in a bottom section of the flow homogenizer with the continuous slug eliminating all of the previously enumerated transition and interface problems. The continuous slug is then extruded through the article-forming die, thereby providing such die with a homogeneous batch having no batch interfacial discontinuities.

SUMMARY OF THE INVENTION

In its very simplest form, the present invention is directed to an improved method of purifying and homogenizing ceramic batch material to be utilized for forming extruded ceramic structures, by removing undesirable interfacial discontinuities from adjacent batch billets or successively applied batch material in a discontinuous or "batch-type" extrusion operation. Whereas the prior art concepts suggested the utilization of pre-extrusion dies to de-air and improve the homogeneity of the batch materials, as well as the use of screens to remove unwanted particles, these known procedures not only failed to contemplate the removal of interfaces between adjacent batch materials but also apparently failed to recognize that such a problem even existed.

Accordingly, we have found that the purity and homogeneity of the batch material can be materially improved during an extrusion process by forcing batch material within an extrusion cylinder through a homogenizer assembly which breaks up and homogenizes interfaces between adjacent charges of batch material, by first forming such batch material into strands or spaghetti form and then recompacting the same into a continuous slug prior to extruding such slug through the article-forming die. The continuous slug which is presented to the article-forming die does not have any interfaces therein, and accordingly only homogeneous batch material flows through the article-forming die so that the extruded article is not plagued with batch transition defects.

It thus has been an object of the present invention to eliminate the problems of batch transition or batch interface between adjacent batch charges which result in voids or skin peel-off in the final extruded product, by homogenizing the batch in the extrusion chamber upstream of the final extrusion die during the extrusion operation, and forming a continuous homogeneous slug of batch material which is presented to the extrusion die for forming the extruded product.

DESCRIPTION OF THE PREFERRED EMBODIMENTS

Figure 1:
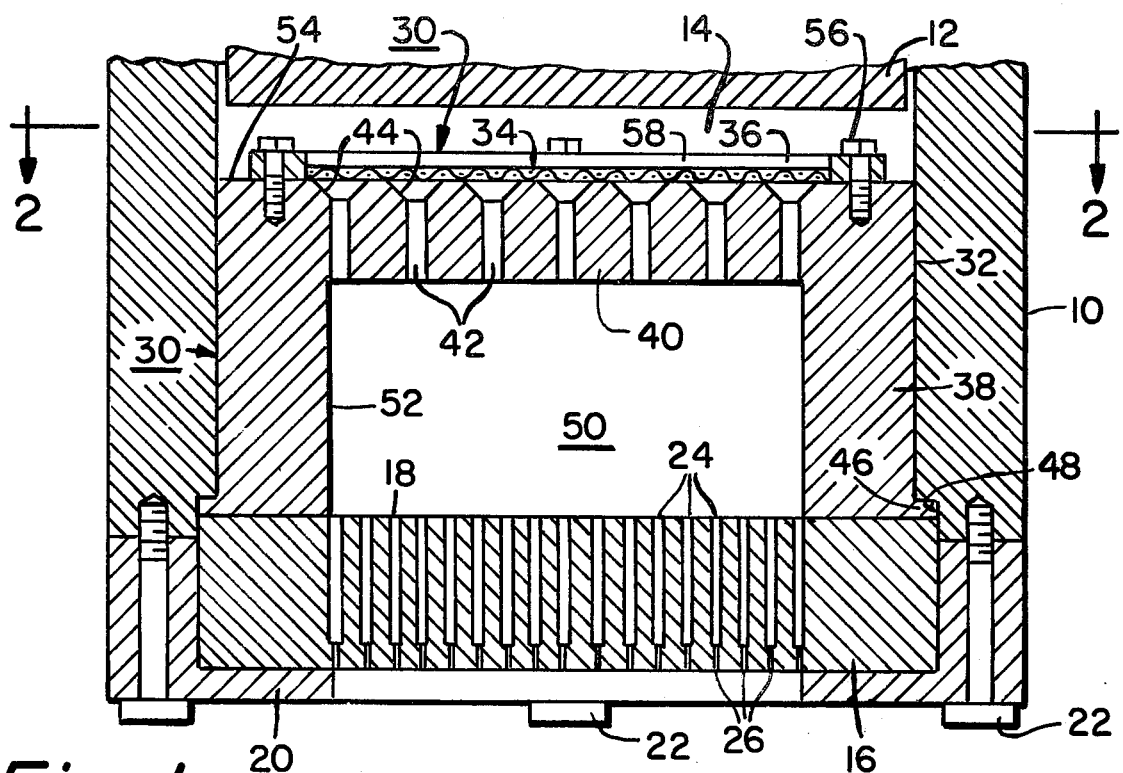
FIG. 1 is a somewhat schematic elevational view in section of a flow homogenizer embodying the present invention positioned within an extrusion cylinder.
Figure 2:
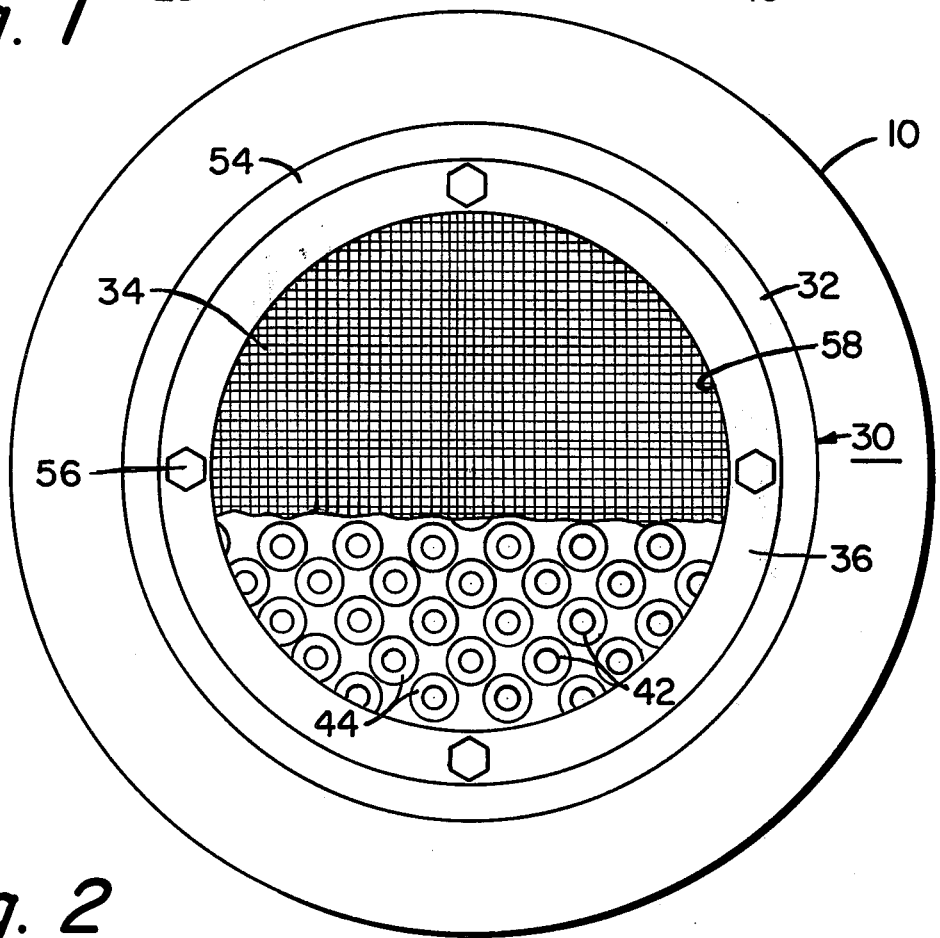
FIG. 2 is a sectional plan view taken along line 2—2 of FIG. 1, with a portion of a screen member being removed to show the passages within the flow homogenizer.

Referring now to the drawings, and particularly FIGS. 1 and 2, an extrusion cylinder 10 is shown having a plunger 12 movable within an extrusion chamber 14. An articleforming die 16 is shown secured to the discharge outlet end 18 of the chamber 14 by means of a retainer ring 20 secured to cylinder 10 by attachment bolts 22. The die 16, which may have any desired outlet configuration, is shown as having a plurality of inlet feed holes 24 and a plurality of interconnected discharge slots 26 for forming a honeycomb ceramic article.

A flow homogenizer assembly 30 is shown positioned within extrusion chamber 14 upstream of the extrusion die 16. The flow homogenizer assembly 30 comprises a main flow homogenizer body member 32, a screen 34, and a combination retaining ring or masking plate 36. The flow homogenizer member 32 is generally cylindrical in shape having cylindrical sidewall portions 38, and a closed upper or inlet wall portion 40 provided with a plurality of passages 42 extending therethrough, chamfered at their inlet end 44. The lower end of cylindrical sidewall portion 38 is provided with an annular flange 46 projecting within a recess 48 formed in extrusion cylinder 10, so as to positionably retain the flow homogenizer assembly within the extrusion chamber through the clamping action of die 16 and retaining ring 20.

The sidewall portions 38 and inlet wall portion 40 define a compaction chamber 50 within the flow homogenizer 32 which communicates with the inlet feed holes 24 of the extrusion die 16. Chamber 50 preferably has a cross section similar in shape to that of the ware to be extruded although slightly larger than such ware. Although the inner side walls 52 of compaction chamber 50 are shown as being parallel with the axis of extrusion, such side walls may be either tapered inwardly or outwardly away from inlet wall portion 40 so as to direct the flow of batch material passing through passages 42 toward the feed openings 24 of die 16. That is, should the desired effective open area of die 16 be smaller than the effective area of inlet wall portion 40, as may be desired for pressure profile, inner side walls 52 of flow homogenizer 32 would be tapered inwardly (such as shown at 52a in FIG. 3) so as to smoothly direct the flow of material from passages 42 into inlet openings 24 and thus avoid dead flow areas. Conversely, should the effective area of die 16 be greater than the effective area of inlet wall portion 40, side walls 52 would be tapered outwardly to accommodate the smooth transition of flow to the inlet holes 24 of die. Also an outward taper may be advantageous for improved pressure distribution at the inlet to die 16.

The wire screen 34 is positioned on the outer or inlet face 54 of inlet wall portion 40 to screen out and remove undesirable particulate matter from the batch material, such as oversize or foreign particles. A retainer ring or masking plate 36, positioned upon peripheral portions of the screen 34, positionably retains the screen on the inlet face 54 of inlet wall portion 40 by means of bolts 56. The screen overlies the chamfered inlet ends 40 of passages 42 to not only initially break up the batch material into fine strands which are reunited prior to passing through passages 42, but also to prevent the passage of undesirable particles through passages 42. The retaining ring 36 may function as a masking plate by varying the size and contour of the central open portion 58, and thereby limit the passages 42 which are open to extrusion chamber 14. That is, the masking plate 36 may be selected so as to have a central open portion to complement the open portion of the final extrusion die 16, so as to regulate flow distribution and obtain a desired pattern of flow of batch material to the extrusion die. Further, inserts may be positioned within chamber 50 to alter its interior contour so as to facilitate the smooth flow of batch material to the die.

In operation, plunger 12 is withdrawn to its outermost position and extrusion cylinder 14 is filled with batch material, either in bulk spaghetti form or in the form of compacted billets, upstream of flow homogenizer 30 so that all interfaces are a given distance upstream of the extrusion die and before the homogenizer. The plunger is then moved forwardly and the extrusion chamber evacuated to eliminate air pockets and voids in the batch. As the plunger continues its forward movement the batch material flows through central open portion 58 of retaining ring or masking plate 36 and through screen 34 and passages 42 into compaction chamber 50. When utilizing bulk spaghetti batch, an interface is formed between the batch remaining in extrusion chamber 14 upstream of flow homogenizer assembly 30 at the end of the previous piston travel, and the batch initially charged into the cylinder in the current operation. Also, when a plurality of a compacted batch billets are charged into the extrusion chamber 14, a similar interface is also formed in such area between each adjacent billet. Without the utilization of the flow homogenizer assembly 30, these interfaces formed between successive bulk batch charges and adjacent compacted billets, produce a discontinuity in flow through the outlet die 16, resulting in voids and skin peelaway within the extruded ceramic article.

However, the flow homogenizer assembly 30 functions to break up the discontinuity between such interfaces and accordingly eliminates the problems caused thereby. That is, screen 34 initially breaks up the batch material flowing therethrough including interfaces while removing undesirable particles, and then the material, which may have reunited, flows through the various passages 42 in the form of strands which are again reunited and coalesced in compaction chamber 50 into a continuous homogeneous slug of batch material which is then fed through the final extrusion die 16. Accordingly, all of the batch material which is finally fed to extrusion die 16 of a continuous homogeneous nature and therefore discontinuous interfacial problems are no longer encountered.

Figure 3:
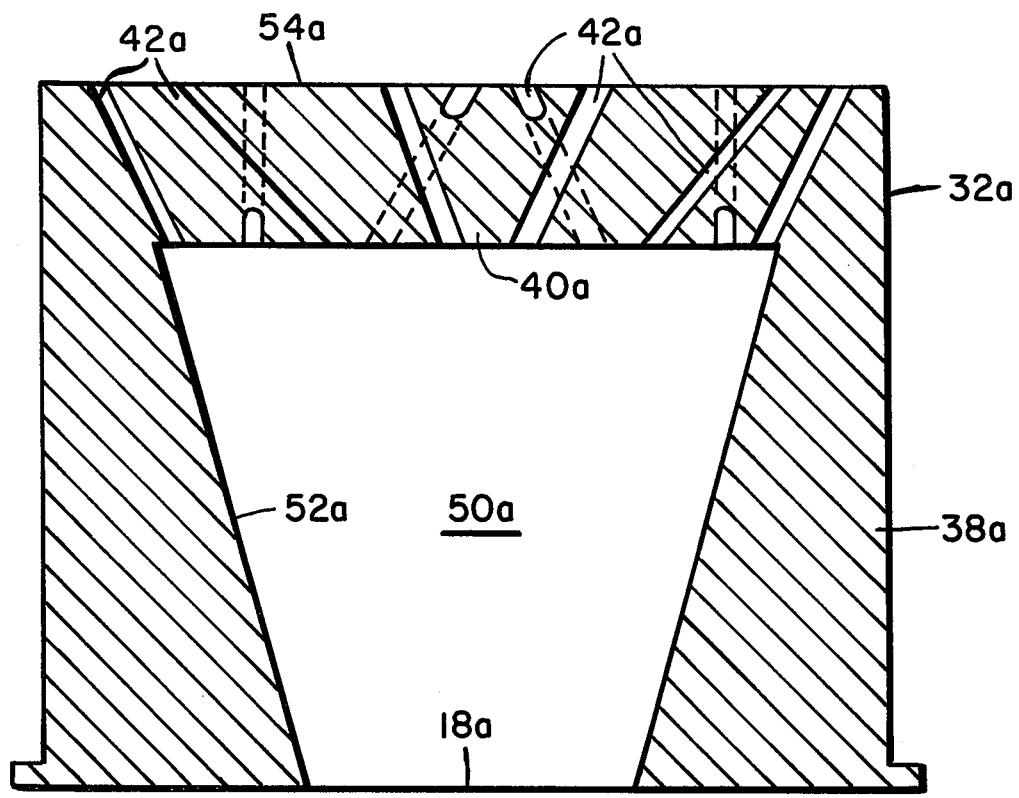
FIG. 3 is an elevational view in section of a modified fluid homogenizer schematically illustrating the positionment of the flow holes passing therethrough.

Referring now to the embodiment shown in FIG. 3, a flow homogenizer body member 32a, similar to homogenizer 32, is shown having substantially cylindrical sidewall portions 38a and a closed upper or inlet wall portion 40a provided with a plurality of diagonally or transversely disposed flow passages 42a which communicate between the outer or inlet face 54a and the compaction chamber 50a. Flow passages 42a differ from flow passages 42, which are shown parallel to the axis of extrusion, since flow passages 42a are angularly positioned to provide further mixing of the batch material as it flows through inlet wall portion 40a. That is, batch material entering flow passages 42a from the extrusion chamber is laterally transposed as it flows through wall portion 40a to an offset position within compaction chamber 50a, relative to its initial orientation in the extrusion chamber. Accordingly, a further mixing of the batch material is achieved as it passes through diagonally or transversely disposed flow passages 42a.

The inner side walls 52a of cylinder portion 38a are shown as being inwardly tapered toward the outlet end 18a of the chamber. Such a taper would be advantageous when the flow homogenizer 32a is utilized with an outlet extrusion die having an effective extrusion area less than the effective flow area of inlet face 54a. Accordingly, although many more flow passages 42a would be provided than schematically shown in FIG. 3, as the batch material is passed through flow passages 42a, it would be reunited and compacted into a continuous slug within compaction chamber 50a and then would be smoothly directed downwardly and inwardly by tapered wall portions 52a toward the effective open portion of the extrusion die as represented by the reduced outlet end 18a. In other respects, however, flow homogenizer member 32a operates in the same manner as a flow homogenizer 32.

Although we have disclosed the now preferred embodiments of our invention, it will be apparent to those skilled in the art that various changes and modifications may be made thereto without departing from the spirit and scope thereof as defined in the appended claims.

We claim:

1. In a discontinuous process of extruding ceramic batch material wherein an interface is formed between individual successive batch charges, a method for eliminating interfacial discontinuities between adjacent batch portions which comprises, loading an extrusion chamber with an initial predetermined amount of batch material so that all batch interfaces within said chamber are at least a given predetermined distance upstream from an extrusion die attached to an outlet end of said chamber, applying a pressing force to the predetermined batch material loaded within said extrusion chamber and flowing said batch material through a plurality of passages within said chamber downstream of said predetermined distance but upstream of said extrusion die, breaking up and dissipating interfacial discontinuities in the batch material as said material is passed through said passages, forming a plurality of strands of batch material as said material is discharged from said passages, compacting said strands of batch material within said chamber into a continuous homogeneous slug of batch material, extruding said homogeneous slug of batch material through said extrusion die, discontinuing the application of said pressing force to the batch material so that a portion of said material remains upstream of the extrusion die at least said given predetermined distance, reloading said extrusion chamber with an additional predetermined amount of batch material so that all batch interfaces in said chamber are at least said predetermined distance upstream of the extrusion die, and again applying a pressing force to the batch material to flow such material through said passages, compact the resulting strands and extrude such material through the extrusion die in the manner set forth with regard to the initial batch material.

2. A method of extruding articles of ceramic batch material as defined in claim 1 including the step of initially breaking up interfacial discontinuities between adjacent batch material by passing said material through a wire screen downstream of said given distance and prior to passing said material through said strandforming passages.

3. A method of extruding articles from ceramic batch material as defined in claim 1 including the step of transversely disposing said batch material within said extrusion chamber while simultaneously flowing said material through said passages.

4. A method of forming extruded articles from ceramic batch material as defined in claim 1 including the step of masking off an upstream side of said passages and thereby preventing the flow of batch material through some of said passages to obtain a desired flow pattern.

* * * * *